United States Patent Office 3,679,574
Patented July 25, 1972

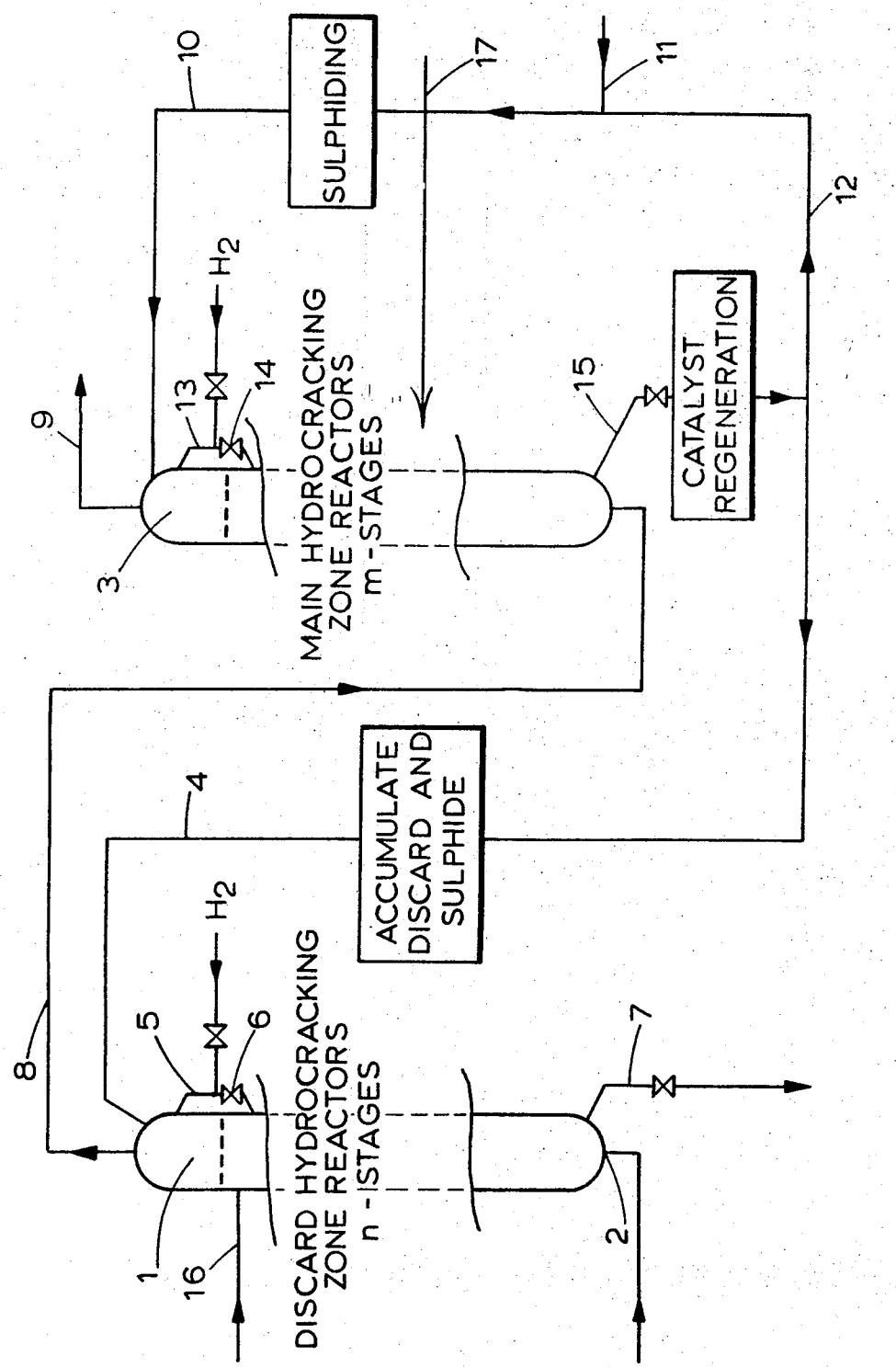

3,679,574
HYDROGENATION PROCESS
Robert L. Irvine, Rob Nes, Pyle Hill,
Woking, Surrey, England
Filed Feb. 25, 1971, Ser. No. 118,699
Claims priority, application Great Britain, Mar. 5, 1970,
10,587/70
Int. Cl. C10g 23/00, 37/00, 37/10
U.S. Cl. 208—57                                    9 Claims

ABSTRACT OF THE DISCLOSURE

The invention relates to the preparation of lube oil and wax from low vanadium content crude or residua feed. The feed is first treated in a catalyst discard zone hydrocracker using catalyst provided by regeneration of low activity catalyst from a subsequent main hydrocracking zone. The discard hydrocracker comprising a plurality of beds containing fluidised catalyst descending in countercurrent to ascending feed and hydrogen. Catalyst transfer between beds is external of the reactor.

---

This invention relates to the production of lube oil and wax.

My U.S. application Ser. No. 810,127 filed Sept. 25, 1969 (now U.S. Pat. 3,607,725 issued Sept. 21, 1971) describes a process for the hydrogenation of non-hydrocarbons in crude or residua feed using descending fluidised catalyst and ascending feed and hydrogen. The process of application Ser. No. 810,127 also describes subsequent hydrocracking of the treated crude or residua. I have now found that the process can be modified and advantageously and economically be applied to lube and wax specialty hydrogenation process particularly for brightstocks and micro-crystalline waxes.

Commercially available processes such as Gulf and as disclosed by U.S. Pats. 2,917,448, 2,960,458, 2,078,221 and 3,285,848 have been limited in their application to distillates or deasphalted residium with a Conradson carbon residue below 4.5 preferably below 2 because of catalyst deactivation and fixed bed kinetics. Other investigators (U.S. Pat. 3,142,634) have examined hydrogenation for the production of lube oil but have used only either distillate or deasphalted residua feedstock.

Part of the micro-crystalline waxes and ceresin waxes are derived from crude seale wax sources which are relatively expensive and these waxes being in short supply have a relatively high unit value today.

Production of brightstocks today in general either comes from an expensive crude source such as Pennsylvania or requires deasphalting.

The process disclosed herein utilizes a residua feedstock derived from a low vanadium crude source such as Libyan which is in plentiful supply today and relatively inexpensive.

Accordingly, the present invention provides a process for the production of lube oil and wax by the catalytic hydrocracking of residua feed stock in a hydrocracking zone, which comprises pre-treating the feedstock by hydrogenation in a catalyst discard zone by passing feedstock and make-up hydrogen upwardly through a reactor comprising a plurality of catalyst beds through which catalyst falls progressively from the top of the reactor to the bottom, which catalyst is derived from a catalyst regeneration stage associated with the catalyst withdrawal point from the subsequent hydrocracking zone, passing the pretreated residua feedstock to the base of a main hydrocracking zone comprising a plurality of hydrocracker reactors each comprising a plurality of catalyst beds, passing the pretreated feedstock and make-up hydrogen upwardly through the hydrocracking reactors in countercurrent to the descending catalyst, removing batches of spent catalyst from the base of the hydrocracking zone, regenerating the catalyst, recycling at least a part of the regenerated catalyst to the discard zone and removing reactor effluent from the hydrocracking zone to heat exchange and high pressure separation.

In the process of the invention therefore the feedstock itself is fed to the catalyst discard zone. The catalyst will differ depending upon the application but in general consists of discrete catalyst particles of a defined particle range preferably not less than 0.6 millimetre nor more than 1.5 millimeters (the lowest practical limit for fixed bed operation because of pressure drop considerations. In practice, fixed beds generally use a catalyst diameter of 2.4 millimetres).

Hydrogen at the inlet is generally below 1500 standard cubic feet per barrel, preferably 650 standard cubic feet per barrel. Hydrogen is injected between stages to replace the chemical hydrogen consumed with the exception in the preheat section hydrogen injection is generally limited to less than 6% of the overall chemical hydrogen consumption.

Cold distillate from the product separation section is injected below the distribution plate of the respective stages for stage temperature control.

The objective of the hydrogenation aromatic in the discard zone is to remove most of the heteroatoms which also results in a lower molecular weight and low carbon residua feed to the following main zone which is maintained at a constant temperature. The desired temperature level varies depending upon whether specialty wax is desired with a good quality brightstock or whether high viscosity index lubricants are desired. The first condition corresponds to a milder temperature as the hydrocracking should only selectively attack polycyclic compound and not normal paraffins.

The liquid recycle from the product section is economically and preferably the distillate from the tray above the flash zone in the tower which takes the diesel product overhead. It has been found that this product favourably influences the reactor and does not require further heat for distillation.

Typically, the stages in the discard zone might contain eight stages in the discard zone and 24 stages in the main zone.

For certain applications the catalyst could consist of a nickel-molybdenum on alumina or similar type catalyst where hydrocracking is not desired.

One embodiment of the process of the invention is illustrated in the accompanying drawing which represents a flow diagram of the process from injection of feedstock into the discard zone to ultimate removal of effluent from the hydrocracking zone to heat exchange and high pressure separation.

Referring now to the drawings, a discard zone reactor 1 takes the form of a column reactor separated into a series of catalyst beds by way of distributor plates. Residua feedstock is fed to the base of the discard zone together with make-up hydrogen by way of line 2 and ascends the discard zone reactor. Catalyst is fed to the top of the discard reactor by line 4. Accordingly the feedstock and hydrogen ascends the reactor in countercurrent to the descending catalyst which falls progressively from the upper to the lower beds of the reactor. In the preferred embodiment illustrated the transfer of catalyst from one bed to the next lower bed is by way of an external catalyst transfer pipe system in that catalyst is removed from an upper bed by way of pipe 5 and transferred to the next succeeding lower bed. The pipe 5 is provided with a valve 6 for closure of the pipe. Interstage hydrogen is injected into the transfer pipe. Treated feedstock is removed from the discard zone reactor by line 8 and spent catalyst is discharged at the base of the reactor through line 7. Treated feedstock from the discard zone passes by way of line 8 into the base of the hydrocracking zone where it is contacted by descending catalyst entering the hydrocracking zone through line 10. The hydrocracking zone is also composed of a series of independent serially arranged catalyst beds through which the catalyst falls progressively from the top of the reactor to the bottom. Also as in the discard zone transfer of catalyst from one bed to the next succeeding lower bed is by way of an external catalyst transfer pipe system comprising pipe 13 and shut-off valve 14 with provision for injection of interstage hydrogen. Spent catalyst is removed from the base of the hydrocracking zone by way of line 15 and it passes to catalyst regeneration. Regenerated catalyst is split after catalyst regeneration, part of the regenerated catalyst passing by way of line 4 into the discard zone reactor and part of the catalyst being recycled by way of line 12 back to the top of the hydrocracking zone reactor. Fresh catalyst makeup is injected through line 11. Reactor effluent is removed from the top of the hydrocracker reactor 3 by way of line 9 through which it passes to heat exchange and high pressure separation not shown. For temperature control liquid product is recycled to the discard zone reactor by way of line 16 entering the reactor beneath the distributor plate of any bed and similarly interstage recycle for temperature control purposes is provided in the main hydrocracking zone reactor system by way of line 17.

As solvent dewaxing is expensive, the preferred feedstock wherein micro-crystalline wax is desired as the principal product is a residua boiling above 820° F. in order to avoid low melting point waxes in the charges. This enables producing a low pour point distillate boiling up to approximately 750° F. highly suitable for transformer oil. The 750° F. plus hydrogenated product when dewaxed produces practically all micro-crystalline wax, and can be solvent fractionated into various melting points. The polycyclic ring scission selectivity which is enhanced by the controlled uniform temperature of the process utilized herein results in a greater wax yield per unit of feed to the relatively expensive solvent dewaxing step.

As the reactor outlet temperature is lowered, and for some applications temperatures below 715° F. are desirable, the usual hydrogen quench results in increasing large hydrogen circulation (see distillate hydrogenation application as an illustration of how much hydrogen circulation is reduced). This is because the sensible heat up to the reaction temperature may be used and chemical hydrogen consumption is generally in excess of 1000 standard cubic feet per barrel.

The lower reaction temperature combined with the relatively high operating pressures generally used enhances the hydrogen partial benefit from the practice of once through hydrogen as the hydrogen solubility decreases with decrease in operating temperature but hydrocarbon and non-hydrocarbon by-product solubility increases.

What I claim is:

1. A process for the production of lube oil and wax by the catalytic hydrocracking of low vanadium content residua feed stock in a hydrocracking zone, which comprises pre-treating the feedstock by hydrogenation in a catalyst discard zone by passing feedstock and make-up hydrogen upwardly through a reactor comprising a plurality of catalyst beds through which catalyst falls progressively from the top of the reactor to the bottom, which catalyst is derived from a catalyst regeneration stage associated with the catalyst withdrawal point from the subsequent main hydrocracking zone, passing the pre-treated residua feedstock to the base of a main hydrocracking zone comprising a plurality of hydrocracker reactors each comprising a plurality of catalyst beds, passing the pre-treated feedstock and make-up hydrogen upwardly through the hydrocracking reactors in countercurrent to the descending catalyst, removing batches of reduced activity catalyst containing carbon from the base of the main hydrocracking zone, regenerating the catalyst, recycling the major proportion of the regenerated catalyst to the main zone and the remainder to the discard zone and removing reactor effluent from the hydrocracking zone to heat exchange and high pressure separation.

2. A process as claimed in claim 1 wherein regenerated catalyst from the main zone is passed to the discard zone on a predetermined basis in accordance with the metal content of the feed to the discard zone.

3. A process as claimed in claim 2 wherein discard of catalyst from the main zone is so effected that the first hydrocracker stage contains fresh catalyst, the second stage contains once regenerated catalyst and twice regenerated catalyst is passed to discard.

4. A process as claimed in claim 1 wherein a portion of the catalyst removed from the hydrocracking zone is combined with fresh catalyst make-up, is sulfided and is returned to the top of the main hydrocracking zone.

5. A process as claimed in claim 1 wherein the catalyst used in the discard zone and the main hydrocracking zone is in the form of discrete catalyst particles having a particle size preferably not less than 0.6 millimetre and not more than 1.5 millimetres in size.

6. A process as claimed in claim 1 wherein the hydrogen feed to the inlet of the discard zone is less than 1500 standard cubic feet per barrel and the hydrogen injected between stages to replace part of the chemical hydrogen consumed.

7. A process as claimed in claim 1 wherein cold distillate from the product separation section is injected below the plates defining individual catalyst beds in the discard zone and in the main hydrocracking zone.

8. A process as claimed in claim 1 wherein the transfer of catalyst from one bed to the next succeeding lower bed both in the discard zone and in the main hydrocracking zone is achieved by way of an external transfer pipe having an outlet immediately above the distributor plate of the upper zone separating this from the lower zone and having an inlet into the lower zone, said pipe being provided with an on/off valve in its lower portion and being provided with means for the injection of inter-stage hydrogen into the transfer pipe.

9. A process as claimed in claim 1 particularly for the production of micro-crystalline wax wherein the feedstock to the discard zone is a residua feedstock boiling above 820° F.

References Cited
UNITED STATES PATENTS

| | | | |
|---|---|---|---|
| 2,987,470 | 6/1961 | Turken | 208—253 |
| 3,496,099 | 2/1970 | Bridge | 208—251 H |
| 3,553,106 | 1/1971 | Hamilton et al. | 208—251 H |
| 3,576,737 | 4/1971 | Mitchell | 208—251 H |
| 3,607,725 | 9/1971 | Irvine | 208—89 |

DELBERT E. GANTZ, Primary Examiner

G. E. SCHMITKONS, Assistant Examiner

U.S. Cl. X.R.

208—89, 251 H